US010080133B2

(12) United States Patent
Ibasco et al.

(10) Patent No.: US 10,080,133 B2
(45) Date of Patent: Sep. 18, 2018

(54) SYSTEM AND METHOD FOR ACTIVATING A MOBILE DEVICE TO INITIATE A COMMUNICATION

(75) Inventors: Alex D. Ibasco, Paranaque (PH); Eduardo Ramon G. Joson, Quezon (PH); William Emmanuel S. Yu, Pasay (PH); Lorenzo Angelo M. Solis, Pinagkaisahan (PH); Rodolfo Alberto A. Villarica, Quezon (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 362 days.

(21) Appl. No.: 14/235,772

(22) PCT Filed: Jul. 26, 2012

(86) PCT No.: PCT/SG2012/000271
§ 371 (c)(1),
(2), (4) Date: Jul. 15, 2014

(87) PCT Pub. No.: WO2013/019160
PCT Pub. Date: Feb. 7, 2013

(65) Prior Publication Data
US 2015/0031351 A1    Jan. 29, 2015

(30) Foreign Application Priority Data

Jul. 29, 2011   (SG) ............................... 201105494-7

(51) Int. Cl.
*H04W 8/22*   (2009.01)
*H04M 3/42*   (2006.01)
(Continued)

(52) U.S. Cl.
CPC ......... *H04W 8/22* (2013.01); *H04M 3/42042* (2013.01); *H04M 7/003* (2013.01);
(Continued)

(58) Field of Classification Search
CPC ................ H04L 65/1006; H04W 4/02; H04W 36/0033; H04W 40/20; H04M 1/575;
(Continued)

(56) References Cited

U.S. PATENT DOCUMENTS 6,763,012 B1 * 7/2004 Lord ................. H04L 29/12254
370/338
9,161,154 B2 * 10/2015 Ibasco ............... H04M 3/42042
(Continued)

FOREIGN PATENT DOCUMENTS

EP        1024643 A1    8/2000
EP        2315419 A2    4/2011
(Continued)

OTHER PUBLICATIONS

International Search Report, dated Nov. 8, 2012 for corresponding International Application No. PCT/SG2012/000271.
(Continued)

*Primary Examiner* — Kathy Wang-Hurst
*Assistant Examiner* — Ernest Tacsik
(74) *Attorney, Agent, or Firm* — Joseph G. Chu; JCIP

(57) ABSTRACT

A system and method for activating a mobile device to initiate a communication directed to a target device is disclosed. The system and method may be implemented via a computing device arranged to send a request for activating the mobile device to initiate a communication, the request comprising a unique identifier of the target device; an unique identifier of the mobile device and contextual information relating to the communication; wherein the mobile device is arranged to receive the request to initiate the machine communication and upon receiving the request, parses and executes the request depending on the nature of the communication channel between the mobile device and target device.

15 Claims, 7 Drawing Sheets

(51) Int. Cl.
*H04M 7/00* (2006.01)
*H04M 3/487* (2006.01)

(52) U.S. Cl.
CPC ........ *H04M 3/4878* (2013.01); *H04M 7/0042* (2013.01); *H04M 2203/2038* (2013.01); *H04M 2203/655* (2013.01)

(58) Field of Classification Search
CPC ..... H04M 2242/30; H04M 2203/2038; H04M 3/42042; H04M 3/42357; H04M 3/42; H04M 3/42025; H04M 3/42059; H04M 3/42093; H04M 3/42102; H04M 3/42348; H04M 3/42374
USPC .......................... 709/207, 228, 237, 244, 245
See application file for complete search history.

(56) References Cited

U.S. PATENT DOCUMENTS

| | | | |
|---|---|---|---|
| 2004/0075675 A1 | 4/2004 | Raivisto et al. | |
| 2004/0233866 A1* | 11/2004 | Bossoli | H04W 36/0033 370/328 |
| 2005/0048958 A1 | 3/2005 | Mousseau et al. | |
| 2007/0121901 A1* | 5/2007 | Mathal | H04M 3/42382 379/265.09 |
| 2007/0274289 A1 | 11/2007 | Buckley et al. | |
| 2008/0027056 A1 | 1/2008 | Parker et al. | |
| 2008/0139186 A1* | 6/2008 | Ringland | H04M 1/2745 455/415 |
| 2008/0270561 A1* | 10/2008 | Tang | G06Q 30/02 709/207 |
| 2009/0144068 A1* | 6/2009 | Altberg | G06Q 30/02 705/342 |
| 2009/0177794 A1* | 7/2009 | Alexander | G06F 17/30029 709/237 |
| 2009/0232288 A1* | 9/2009 | Forbes | H04M 3/42025 379/93.23 |
| 2010/0115034 A1 | 5/2010 | Sheth et al. | |
| 2010/0124324 A1* | 5/2010 | Murakami | H04M 3/38 379/216.01 |
| 2010/0159942 A1* | 6/2010 | Lewis | H04M 3/42093 455/456.1 |

FOREIGN PATENT DOCUMENTS

| | | |
|---|---|---|
| JP | 2008042083 A | 2/2008 |
| JP | 2010518701 A | 5/2010 |
| WO | 2008095103 A2 | 8/2008 |
| WO | 2011081181 A1 | 7/2011 |

OTHER PUBLICATIONS

International Preliminary Examination Report, dated Jun. 26, 2013 for corresponding International Application No. PCT/SG2012/000271.

* cited by examiner

SYSTEM AND METHOD FOR ACTIVATING A MOBILE DEVICE TO INITIATE A COMMUNICATION

FIELD OF THE INVENTION

The present invention relates to a system and method for activating a mobile device to initiate a communication. The invention is particularly suited, but not limited to activating a mobile device to initiate a voice call.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

The concept of automatically calling phone numbers displayed on social networking websites and other webpage(s) by clicking on them is known colloquially as 'click-to-call'. While there are many methods wherein users are able to accomplish 'click-to-call', most of these methods merely automate the process of calling without the need to manually dial the callee's number.

To elaborate an example of a typical 'click to call' functionality, when a mobile smartphone user surf the Internet and clicks on an icon (usually a phone icon) found on a webpage or social networking site, he is merely clicking on a link to activate a VOIP call to the specific callee's phone number. There is no further information relating to the context or purpose of the VOIP call which is transmitted to the callee.

The described concept above does not take into account contextual information pertaining to the call. The contextual information may be in the form of images, video clips, text comments, etc. Such context information may be important to the receiving party (hereinafter referred to as 'callee') as he/she may wish to know the purpose of the call before accepting the call.

Further, for current 'click-to-call' functionality, the connection between the caller and callee is typically achieved by a dedicated software application and/or dedicated communications channels, which often requires the user of the service to subscribe to an independent service from that already provided by the host network of the caller.

There exists a need and demand for contextual information to be provided to the callee, and in addition for current 'click-to-call' functionality to be implemented with existing network resources.

The present invention seeks to at least partially meet the above mentioned needs.

SUMMARY OF THE INVENTION

In accordance with a first aspect of the present invention there is provided a system for activating a mobile device to initiate a communication directed to a target device comprising a computing device arranged to send a request for activating the mobile device to initiate a communication; the request comprising a unique identifier of the target device; a unique identifier of the mobile device; a trigger for executing the communication and contextual information relating to the communication; wherein the mobile device is arranged to receive the request to initiate the communication and upon receiving the request, parses and executes the request according to a specific communication protocol depending on the nature of the communication channel between the mobile device and target device.

Preferably, the unique identifier of the mobile device and target device are the MSISDN of the mobile device and target device respectively; and the contextual information is a text message related to the purpose of the communication.

Preferably, the communication channel is an Internet Protocol network, the mobile device is arranged to parse and execute the request according to a Session Initiation Protocol (SIP) network. In such case, it is preferable that the "S" field of the SIP is transmitted as part of the SIP invite message from the mobile device to a SIP gateway and then forwarded from the SIP gateway to the target device, the "S" field of the SIP protocol is used to contain the contextual information.

Preferably, where the communication channel is a telecommunications GSM voice network, the mobile device is arranged to parse and execute the request according to a Callback protocol.

Preferably, the contextual information is a text message, an image, a video clip or a combination of any two of said contextual information.

Preferably, the system includes a location-based service configured to provide information on the location of the mobile device to the target device and the information on the location of the target device to the mobile device.

In accordance with a second aspect of the present invention there is provided a mobile device capable of initiating a communication to a target device, the mobile device arranged to receive a request from a computing device to initiate the communication to the target device, the request comprising a unique identifier of the target device; an unique identifier of the mobile device and contextual information relating to the communication; wherein upon receiving the request the mobile device parse and execute the request according to a specific communication protocol depending on the communication channel between the mobile device and target device.

Preferably, the mobile device comprises direct machine-to-machine communication means comprising one or more of the following:—Near Field Communication (NFC), Bluetooth, and Infra-red data association (IrDA).

Preferably, the mobile device is integrated with the computing device.

Preferably, the mobile device is a smartphone.

In accordance with a third aspect of the present invention there is provided a method for activating a mobile device to initiate a communication directed to a target device comprising the steps of: receiving at the mobile device a request to initiate a communication; the request comprising a unique identifier of the target device; the unique identifier of the mobile device; a trigger for executing the communication and contextual information relating to the context of the communication; parsing the request to determine the contextual information and the unique identifier of the target device; and forwarding the contextual information and the trigger to the target device via a specific communication protocol depending on the communication channel utilized by the mobile device to initiate the communication.

Preferably, the communication channel is an Internet Protocol network, the mobile device parses and executes the request according to a Session Initiation Protocol (SIP) network. In this case, the "S" field of the SIP is transmitted as part of the SIP invite message from the mobile device to a SIP gateway and then forwarded from the SIP gateway to the target device, the "S" field of the SIP protocol is used to contain the contextual information.

Preferably, where the communication channel is a telecommunications GSM voice network, the mobile device parses and executes the request according to a Callback protocol.

BRIEF DESCRIPTION OF THE DRAWINGS

The present invention will now be described, by way of illustrative example only, with reference to the accompanying drawings, of which.

Figure 1:
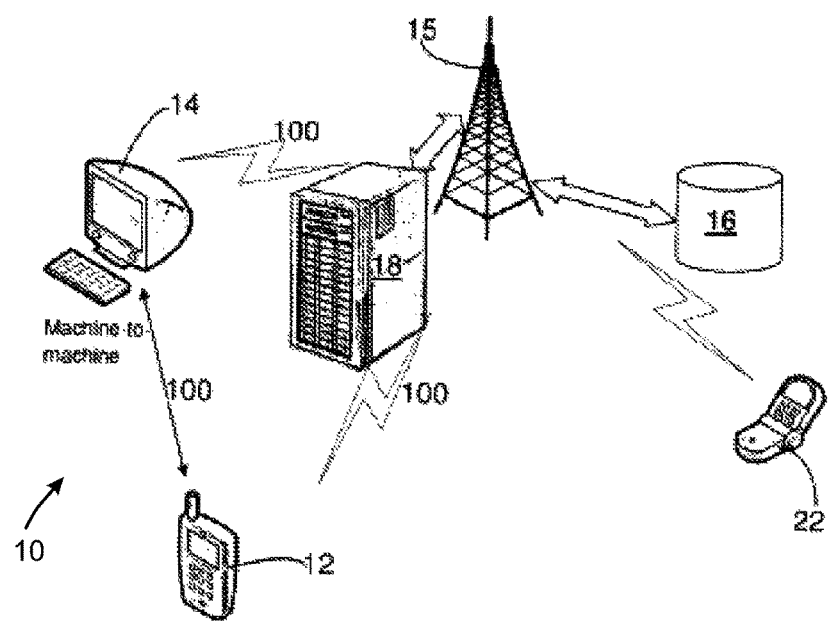
FIG. 1 is a schematic representation of a system for activating a mobile device to initiate a communication in accordance with an embodiment of the present invention.

Other arrangements of the invention are possible and, consequently, the accompanying drawings are not to be understood as superseding the generality of the preceding description of the invention.

DESCRIPTION OF EMBODIMENTS OF THE INVENTION

In accordance with an embodiment of the invention there is a system 10 for activating a mobile device 12 to initiate a communication. The system 10 comprises a computing device 14 arranged to be in data communication with the mobile device 12. The data communication between computing device 14 and mobile device 12 may be via a direct machine-to-machine communication link such as Near Field Communication (NFC), BLUETOOTH wireless technology standard, Infra-red data association (IrDA), or via a remote Internet Protocol (IP) network such as General packet radio service (GPRS) network, depending on the hardware capabilities of the computing device 14 as known to a skilled person.

In the embodiment, the user of mobile device 12 is a subscriber of a communications network 15 such as a telecommunications carrier 15. Telecommunications carrier 15 comprises a subscriber database 16 and a communication facilitator 18 arranged to communicate with the computing device 14 and the mobile device 12.

Mobile device 12 is preferably a Smartphone, in which case it is appreciated that computing device 14 and mobile device 12 may be integrated as a single device. Further, mobile device 12 has the capability to parse and execute a request 100 to initiate a communication which originates from the computing device 14.

The request 100 to initiate a communication includes:
a. a unique identifier, for example the MSISDN of the mobile device 12;
b. a unique identifier, for example the MSISDN of a target party 22 which the communication is directed to;
c. the contextual information relating to the communication; and
d. a trigger to execute the communication.

As an example, if the request 100 from the computing device 14 is to initiate a voice call to the target party 22 relating to a Facebook™ post, the contextual information may be the Facebook™ post or any content relating to the Facebook™ post, which may include a status update or comment posting in text format; video post (video file format) or advertisements (image format). The capability to parse and execute the communication may be via an Application Programming Interface (API) or/and via a simple directory tweak on software components of computing device 14 as known to a skilled person.

The computing device 14 may be a computer, a laptop, or a Smartphone (when integrated with the mobile device 12) as mentioned above, which has the capability to display webpages including social networking sites or install software applications for supporting these sites. Examples of software applications may for example include IPhone™ or Android™ 'apps' for the respective Smartphone. Computing device 14 is configured to send the request to the mobile device 12 in a variety of ways, such as for example via accessing an IP network (GPRS or otherwise) of the telecommunications carrier 15. This is dependent on the service development platform and the communication protocol adopted by the telecommunications carrier 15.

Subscriber database 16 contains information relating to all subscribers in the system 10. The information includes the Mobile Subscriber Integrated Services Digital Network Number (MSISDN) and/or other details for the purpose of uniquely identifying the mobile device 12.

Communication facilitator 18 is typically a proxy server arranged to facilitate communication between computing device 14 and mobile device 12 in the case where there is no direct machine-to-machine communication between the computing device 14 and mobile device 12.

The invention will next be described in the context of a method for activating the mobile device 12 belonging to a user A to initiate a VOIP voice call to a recipient target device 22 of a user B in a scenario where user A is browsing a social networking site on his/her computing device 14. User B's mobile phone 22 is capable of displaying both the data and contextual information for the user B to see the context or purpose behind the call.

The social networking site, for example Facebook™, may include a persistent call icon or clickable item associated to each post, comment, and other update done by a particular user. Such a feature could be partially or fully disabled depending on the user preference on the same.

Figure 2:
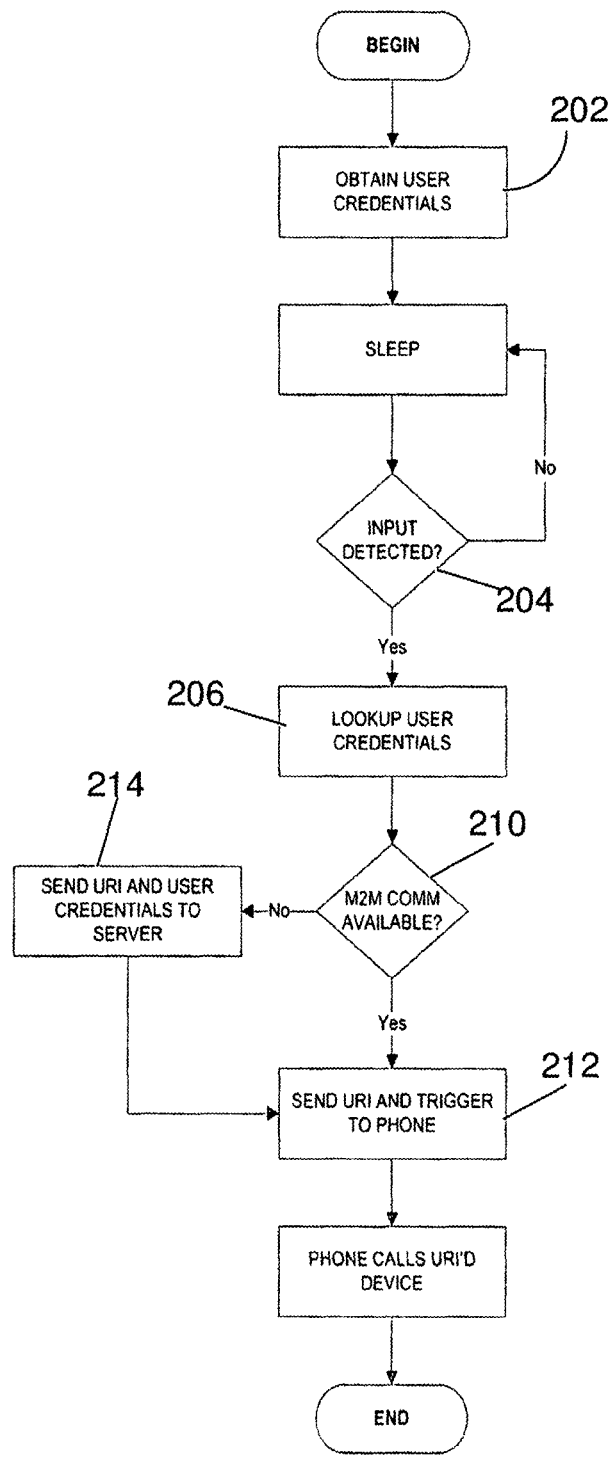
FIG. 2 is a flow diagram of the method for activating a mobile device to initiate a communication in accordance with the embodiment of the present invention.
Figure 3A:
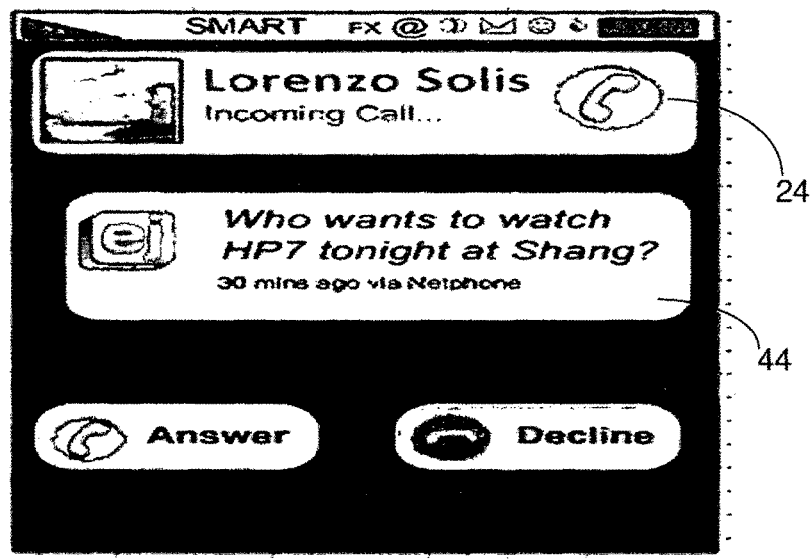
FIGS. 3a to 3e illustrates examples of the types of contextual information which could accompany the communication according to embodiments of the invention.
Figure 3B:
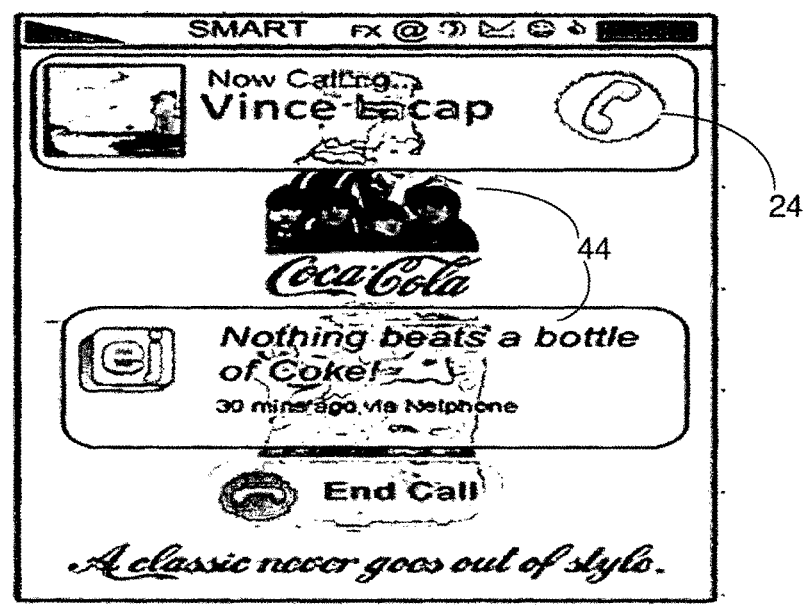
Figure 3C:
Figure 3D:
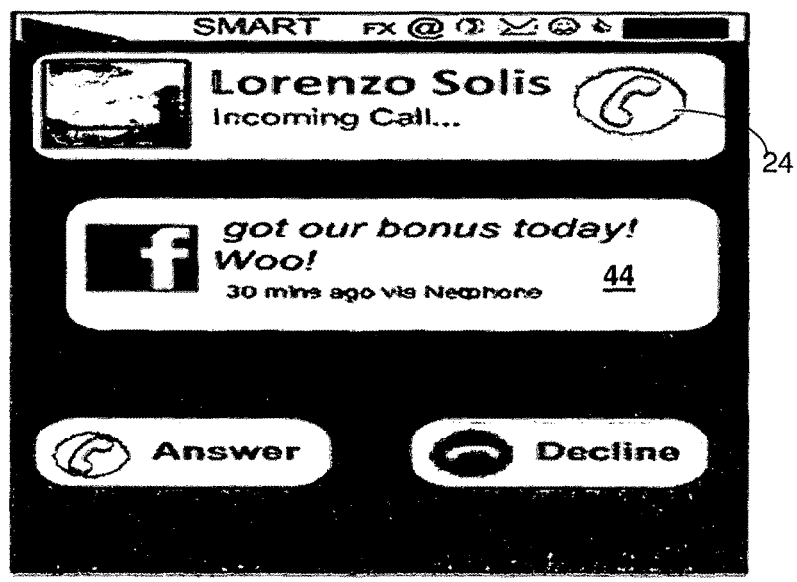
Figure 3E:
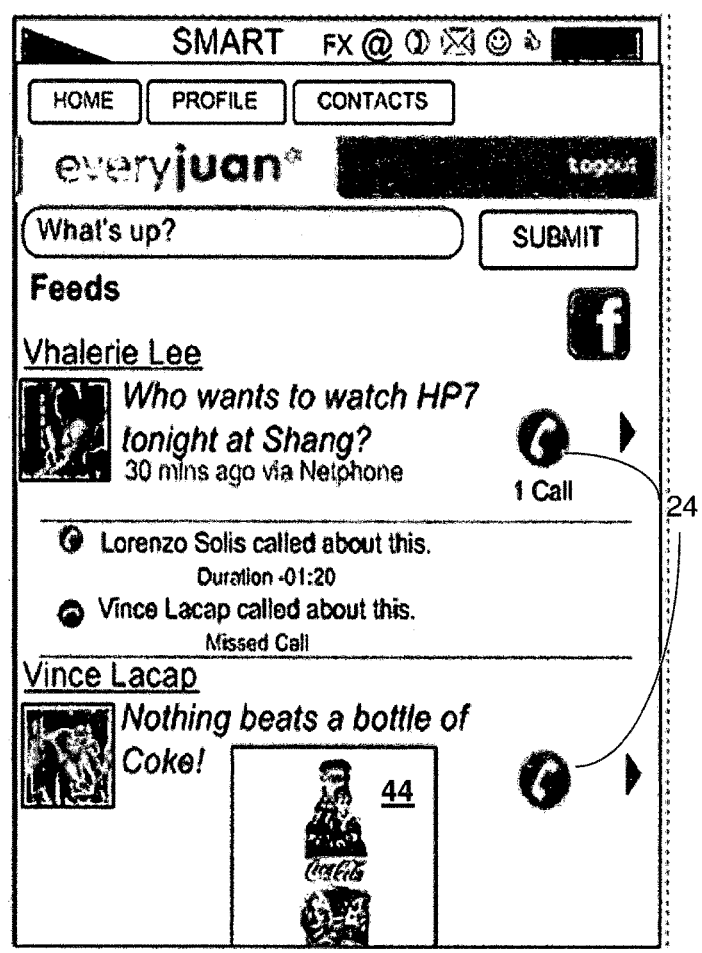

A flowchart of the method is shown in FIG. 2.

The process begins with the computing device 14 requesting/prompting the user A to input a set of credentials for the purpose of associating/linking his activity on the social networking site to his mobile device 12 (step 202). The credentials may be manually inputted using available input means such as keyboard or mouse, via a physical token such as a dongle; or may be through machine-to-machine communication between the mobile device 12 and the computing device 14 via BLUETOOTH, NFC, IrDA etc. Depending on the user's security preference, the prompting of the credentials may be one-off or required at each log-in.

After the credentials are inputted, the computing device 14 continuously monitors for the user A's click on a 'click-to-call button' in any post entry (step 204) on the Facebook™ page. The entry 44 may be a text post, a video post, a status update, an advertisement etc. Such entry would be the 'contextual information' which accompanies the call from mobile device 12 to target device 22.

Once a valid input is detected (step 206)—i.e. the 'click-to-call' 24 is clicked, the computing device 14 queries the subscriber database 16 based on the credentials provided at step 202. The subscriber database 16 at least checks if the MSISDN of the mobile device 12 is a valid entry in the subscriber database 16 for verification purposes.

After verifying the credentials provided with the subscriber database 16, the system 10 checks to determine if there is any enabled machine-to-machine communication means between the mobile device 12 and computing device 14 (step 210). If there is a direct machine-to-machine communication link between the computing device 14 to the mobile device 12 (i.e. via BLUETOOTH for example), the request 100 to activate the voice call (i.e. including contextual information and trigger to dial the number of the recipient mobile device 22) is sent to the mobile device 12 to activate the call process to recipient mobile device 22 (step 212). The contextual information provided may include an update to status, a new post, a response to a post or status, an advertisement, video post, etc. as well known to a person skilled in the art. (see FIG. 3 a to e).

If it is detected that there is no machine-to-machine communication means between the mobile device 12 and computing device 14, the Uniform Resource Identifier (URI) of the recipient mobile device 22 (such as its MSISDN) as well as the user credentials of the mobile device 12 are sent to the communication facilitator 18 (step 214) which is within the same network as the computing device 14. The communications facilitator 18, upon receiving the information, forwards the information to the mobile device 12 via the host network 15 of the mobile device 12 (for example via the GSM network). The information includes the MSISDN or mobile phone number of the recipient device 22, the contextual information relating to the text post, video post, status update, advertisement etc as described earlier. The communication facilitator 18 includes a trigger for the mobile device 12 to call the recipient mobile device 22. The trigger includes the URI in the form of a URL. For example, the trigger may be in the form <a href="tel:5551234567"><img src="callme.jpg" /></a> where the contextual information is an image. The use of "tel" may depend on the model of Smartphone. For Android™ Smartphones it may be in the form of "wtai://wp/mc;" instead of "tel".

Once a valid trigger is received, the mobile device 12 proceeds to activate the call request to the recipient mobile device 22 (step 212).

The sending of contextual information from the mobile device 12 to target device 22 is preferably supported by either a Session Initiation Protocol (SIP) or a Call-back protocol. The protocol to be adopted depends on the communication channel or communication network being utilized to make the call, particularly whether it is over the IP network or voice network. At step 212, if it is detected that the call from the mobile device 12 to mobile device 22 is a data call, i.e. VOIP call, the SIP approach, such as the—RFC 2543 rule standard, or other updated standards such as the RFC 3261 will be used. If it is detected that the call from the mobile device 12 to mobile device 22 is a normal voice call routed via the GSM network of the mobile device 12, the call-back protocol approach, as illustrated in FIG. 5, will be used as the signalling protocol.

Figure 4:
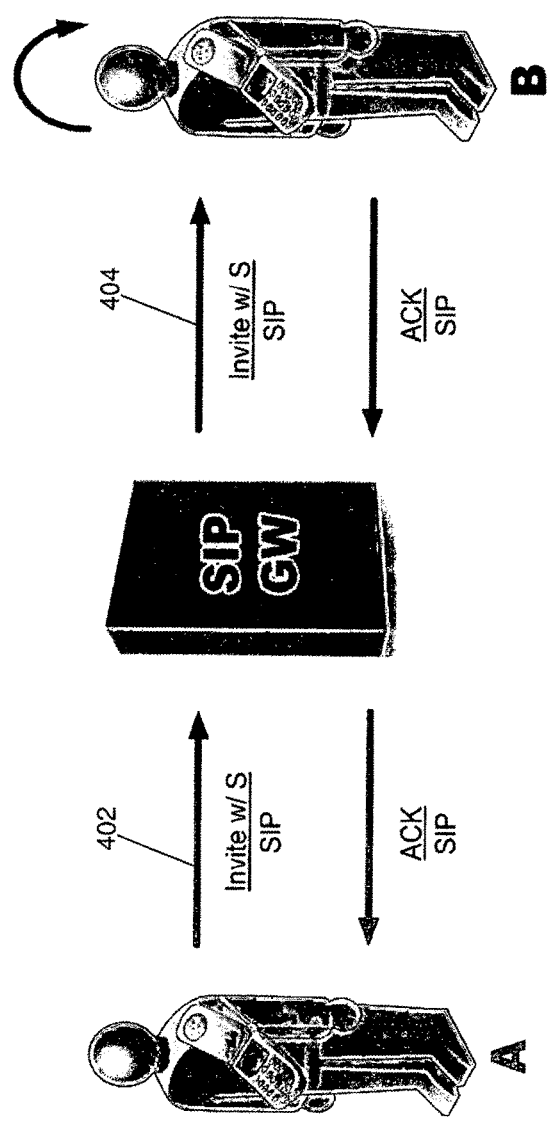
FIG. 4 illustrates Session Initiation Protocol (SIP) as a possible signalling mechanism.

The SIP protocol, illustrated in FIG. 4, is a signalling protocol used for establishing sessions in an IP network. The SIP protocol supports multimedia, voice and video calls over IP network. To initiate the process of the VOIP call from user A to user B, the "S" field of the SIP protocol is transmitted as part of the SIP invite message from the user A to the SIP gateway (step 402) and then forwarded from the SIP gateway to user B (step 404). The "S" field of the SIP protocol is used to contain the contextual information.

Thus, before the user B answers the voice call, the contextual information is already available in the "S" field. A client software installed on the device 22 may then process and render this information accordingly (or derive additional information if necessary). The client software is specific to the device 22. For example, if device 22 is an Android™ phone, the client software would be an android specific application to unpack the information in the "S" field.

Figure 5:
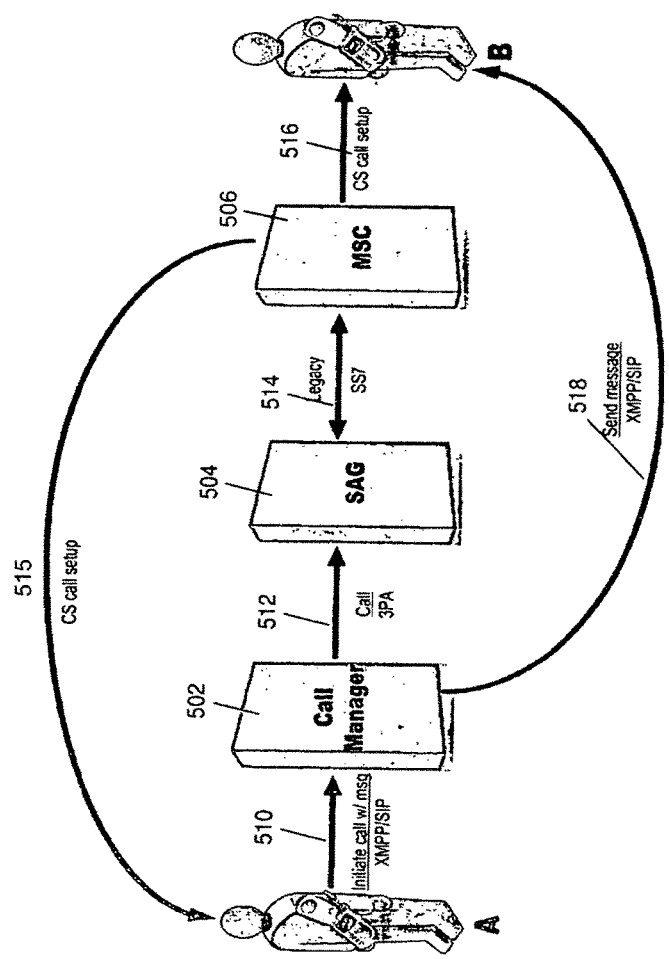
FIG. 5 illustrates a Call-back Procedure as a possible signalling mechanism.

The callback approach, as illustrated in FIG. 5, comprises a call manager 502 which is suited for processing voice calls, SMS, conference calls, FAX, and/or circuit switched data. Once detected that mobile device 12 is calling mobile device 22 via a normal voice network—for example a GSM network, with the contextual content in XMPP or SIP format, the call is routed to call manager 502 for processing (step 510). The call manager 502, upon receiving the call and content, calls a Service Access Gateway 504 of the network of mobile device 22 to establish the call (step 512). The Service Access Gateway (SAG) 504 transmits the call to the Mobile Switching Centre (MSC) 506 of the network and check for legacy, i.e. whether it supports the SS7 protocol which is essential for the support of the voice call transmission with contextual information (step 514). Once completed, the MSC 506 initiates a circuit switched (CS) audio call setup to user A's mobile device 12 (step 515), after which call manager 502 sends the XMPP message to user B (step 518) contemporaneously with the MSC 506 making a CS audio call to user B to connect the voice call (step 516).

Being a mobile network and having potential race conditions, it is important that the payload (contextual information) is as concise and 'in-line' as possible. As an alternative to embedding the contextual information in its entirety, a trigger may be embedded in the 'S' field of the SIP protocol or the XMPP message of the call-back approach. These trigger information is then used to get more details information on the context of the call from a web service.

In a separate embodiment, the present invention may include a Location Based Service (LBS) which enable user A's location to be visible to user B as a type of contextual information. The location of user A may be based on tower triangulation, GPS or other known technology.

The present invention was developed in order to provide a method of communication between a user's computing interface and mobile device. The invention aims to overcome the challenge of static click-to-call models, and to leverage on existing resources and software available on the mobile device and/or telecommunications network 15. The described invention provides a way to call a target party 22, including and displaying the reason or context for the user of a source mobile device 12, or the context when such call is made, such as displaying information about the content where the call has been invoked.

Advantageously, the invention introduces a communication (voice call) initialization process using a network independent of the network used to access the content. Thus, a website accessed via the IP network will have the functionality of connecting the user's mobile phone to a receiving node specified in the website. The mobile phone may use the IP network, but not the same connectivity as that of the client device used to access the website, or it may even use a totally independent network such as the GSM network of the mobile device.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described:

Besides the discussed signalling protocols (SIP and callback protocols), other signalling protocols such as H.323 (to provide audio-visual communication sessions on any packet network) may be used. In addition, other signalling mechanism based on call-initiation API may be used as long as it is within the scope of the invention to communicate and provide specific contextual information which accompanies the communication to the target device 22. It is to be appreciated that the contextual information may be in the form of a trigger to initiate additional actions, such as play a video clip or animation which was already previously downloaded on the target device 22. The contextual information may also be in the form of an activity stream with an activity item that connects to an activity stream manager.

The prevalence of calling APIs provides an alternative signalling mechanism which could be used to initiate the call.

In the various signalling mechanism or protocols, triggers or contextual information are sent in-band within the signalling mechanism or protocol of the call.

As an alternative to the communication facilitator 18, the contextual information may be sent directly to the target device 22. The communication facilitator 18 is suited for use when the recipient pulls more content based on the context information provided by the sender. This pull is done progressively.

The above embodiment is described in the context of the communication being a voice call. It is appreciated that the communication originating from the computing device 14 may be an SMS, other message type, or event synchronization to mobile phone 12, 22. In the case of event synchronization, the system 10 may be employed such that the event would be saved into the mobile phone 22 calendar functions.

In the case where the communication is a calendar function, the context information for calendar functionality is implemented using calendar files such as ICAL format. In the case where the communication is a SMS, only the destination identifier and custom (text) message is required.

The invention is suited for rendering and presenting contextual information on a target device within mobile networks. Mobile networks are generally subject to varying network conditions. As such the amount of contextual information that can be obtained by the client may vary. These mechanisms allow the sending of an in-band trigger (minimum amount of contextual information) and have that minimum contextual information rendered in the target device. As more time and bandwidth is available, the target device may then obtain more information using the trigger information. This allows the target device to render a range of information properly depending on network conditions. This mechanism is similar to how GIF images are progressively loaded. The invention thus supports progressive availability of social information.

The contextual information as described in the embodiments of the invention may also have various formats as known to a skilled person. These formats may include codes containing particular activities. In additional to the code, message specific information may be contained in the contextual information.

The invention claimed is:

1. A system for facilitating a "click-to-call" functionality comprising:
a mobile device arranged to initiate a call directed to a target device;
a computing device monitoring for a user's selection of a "click-to-call" button on a website, in response to receiving the selection of the "click-to-call" button, the computing device arranged to send a request for activating the mobile device to initiate the call, wherein there is an existing communication channel being utilized between the mobile device and the target device, and the existing communication channel is provided by a host network of the mobile device, wherein the computing device is configured to at least partially disable the "click-to-call" functionality based on user preference,
the request comprising a unique identifier of the target device, a unique identifier of the mobile device, a trigger for executing the call and contextual information relating to the call, wherein the contextual information is content related to the website associated with the "click-to-call" button;
wherein the mobile device is arranged to receive the request to initiate the call and upon receiving the request, parses and executes the request according to a specific communication protocol depending on the nature of the existing communication channel,
the contextual information accompanies the initiated call for display on the target device to allow a user of the target device to know the reason or context of the call based on the contextual information before deciding whether to accept the initiated call.

2. The system according to claim 1, wherein the unique identifier of the mobile device and the target device are the MSISDN of the mobile device and the target device respectively; and the contextual information is a text message related to the purpose of the call.

3. The system according to claim 1, wherein where the existing communication channel is an Internet Protocol network, the mobile device is arranged to parse and execute the request according to a Session Initiation Protocol (SIP) network.

4. The system according to claim 1, wherein where the existing communication channel is a telecommunications GSM voice network, the mobile device is arranged to parse and execute the request according to a Callback protocol.

5. The system according to claim 1, wherein the contextual information is a text message, an image, a video clip or a combination of any two of said contextual information.

6. The system according to claim 1, wherein the system includes a location-based service configured to provide information on the location of the mobile device to the target device and the information on the location of the target device to the mobile device.

7. The system according to claim 3, wherein the "S" field of the SIP is transmitted as part of the SIP invite message from the mobile device to a SIP gateway and then forwarded from the SIP gateway to the target device, the "S" field of the SIP protocol is used to contain the contextual information.

8. A mobile device capable of facilitating a "click-to-call" functionality, wherein, the mobile device is arranged to receive a request from a computing device to initiate a call to a target device, the computing device monitoring for a user's selection of a "click-to-call" button on a website, in response to receiving the selection of the "click-to-call" button, the computing device sending the request to the mobile device, wherein the computing device is configured to at least partially disable the "click-to-call" functionality based on user preference, wherein there is an existing communication channel being utilized between the computing device and the mobile device, and the existing communication channel is provided by a host network of the mobile device, the request comprising a unique identifier of the target device, an unique identifier of the mobile device and contextual information relating to the call, wherein the contextual information is content related to the website associated with the "click-to-call" button; wherein upon receiving the request the mobile device parse and execute the request according to a specific communication protocol depending on the existing communication channel, and the contextual information accompanies the initiated call for display on the target device to allow a user of the target device to know the reason or context of the call based on the contextual information before deciding whether to accept the initiated call.

9. The mobile device according to claim 8, wherein the mobile device comprises direct machine-to-machine communication means comprising one or more of the following: Near Field Communication (NFC), BLUETOOTH, and Infra-red data association (IrDA).

10. The mobile device according to claim 8, wherein the mobile device is integrated with the computing device.

11. The mobile device according to claim 8, wherein the mobile device is a smartphone.

12. A method for facilitating a "click-to-call" functionality, comprising the steps of:

receiving at a mobile device a request to initiate a call;

a computing device monitoring for a user's selection of a "click-to-call" button on a website, in response to receiving the selection of the "click-to-call" button, wherein the computing device is configured to at least partially disable the "click-to-call" functionality based on user preference, the computing device sending the request to the mobile device, the request is sent by a computing device, wherein there is an existing communication channel being utilized between the computing device and the mobile device, and the existing communication channel is provided by a host network of the mobile device;

wherein the request comprising a unique identifier of the target device, a unique identifier of the mobile device; a trigger for executing the call and contextual information relating to the context of the call, wherein the contextual information is content related to the website associated with the "click-to-call" button;

parsing the request to determine the contextual information and the unique identifier of the target device;

forwarding the contextual information and the trigger to a target device via a specific communication protocol depending on the existing communication channel; and accompanying the contextual information for display with the initiated call on the target device to allow a user of the target device to know the reason or context of the call based on the contextual information before deciding whether to accept the initiated call.

13. The method according to claim 12, wherein where the existing communication channel is an Internet Protocol network, the mobile device parses and executes the request according to a Session Initiation Protocol (SIP) network.

14. The method according to claim 12, wherein where the existing communication channel is a telecommunications GSM voice network, the mobile device parses and executes the request according to a Callback protocol.

15. The method according to claim 13, wherein the "S" field of the SIP is transmitted as part of the SIP invite message from the mobile device to a SIP gateway and then forwarded from the SIP gateway to the target device, the "S" field of the SIP protocol is used to contain the contextual information.

* * * * *